United States Patent Office 3,441,553
Patented Apr. 29, 1969

3,441,553
CRACK-FREE ANTI-ELECTROSTATIC MOLDED BODIES MADE FROM POLYETHYLENE
Konrad Rombusch, Marl, and Ursula Eichers, Recklinghausen, Germany, assignors to Chemische Werke Huls Aktiengesellschaft, Marl, Germany, a corporation of Germany
No Drawing. Filed Sept. 27, 1966, Ser. No. 582,247
Claims priority, application Germany, Oct. 8, 1965, C 37,095
Int. Cl. C08d *3/04;* C09k *3/16*
U.S. Cl. 260—94.9          1 Claim It is well known that plastic materials, especially materials made from polyethylenes have the tendency to attract dust particles when in storage or in use due to electrostatic charge, a fact which lowers their functional value considerably.

In order to overcome this difficulty various expedients have been proposed. For instance one may coat the surfaces of objects made from polyethylenes with a substance which will reduce the electrostatic charge. This method however has usually the disadvantage that its effectiveness will be lost during use or after cleaning when the anti-electrostatic coating is removed. A more permanent effect will be attained if the anti-electrostatic material is worked into the polymer and molded bodies are then prepared from such mixtures. Additives of this type are for example quaternary ammonium salts, polyalkyleneglycols and polyalkyleneglycol esters. Still better are the previously proposed oxyethylates, alkanols and alkylarylphenols (Belgian Patent No. 536,623 and British Patent No. 731,728) but these substances tend to exude if admixed in sufficient quantities to assure their effectiveness.

Anti-electrostatic effectiveness can be increased further by use of nitrogenous compounds, for example amides and aminocarboxylic acid derivatives (French Patent No. 1,377,803–8), primary and secondary alkylamines (Belgian Patents Nos. 655,182 and 655,183 which are identical with published Netherlands applications 6,412,-719 and 6,412,720) and oxyethylates of alkylamines and fatty acid amides (Belgian Patent No. 645,800 and French Patent No. 1,322,626).

All compounds proposed heretofore have one disadvantage in common, namely that they will hasten crack formation in highly crystalline polyethylenes if they are used to form complex and large articles by the extrusion process, especially if different thicknesses of bent walls, sharp-edged passages and reinforcing ribs of various sizes are present, and the processing has to be carried out under adverse conditions. The cracks will occur primarily at critical points under stress and their formation will be accelerated if the molded parts are stored at higher temperatures.

The surprising discovery has been made that molded masses and bodies, made from polyethylene, alone or mixed with standard additives such as stabilizers and pigments, have excellent anti-electrostatic properties and at the same time great stability against crack formation if they are given a content of .1 to 4 percent by weight, relative to the polyethylene, of salts according to the formula

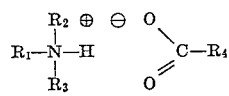

wherein
$R_1$, $R_2$ and $R_3$ each represents an alkyl, alkenyl, alkylcycloalkyl, aryl, alkylaryl or alkenylaryl group with 6 to 26 carbon atoms in the alkyl or the alkenyl group,
$R_2$ and $R_3$ each represent also an alkyl group with 1 to 5 carbon atoms and/or the group $(C_xH_{2x}O)_nH$ in which $x=2$ or 3 and $n=0$ to 10, and
$R_4$ represents an alkyl, alkenyl or aryl group with 5 to 25 carbon atoms in the alkyl or alkenyl group.

Suitable polyethylenes are both types, those having a crystalline portion of >75%, especially 75–85%, and those having a crystalline portion of <75%, especially 40–75%.

Suitable amine components of the formula

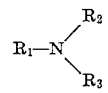

are those in which $R_1$, $R_2$ and $R_3$, each represent a saturated or unsaturated, straight-chain or branched-chain alkyl or alkylcycloalkyl or alkylaryl group with 6 to 26, and preferably 10 to 18 carbon atoms in the alkyl group, or an aryl group. Suitable as group $R_1$ are for example the hexyl, n-octyl, ethylhexyl, n-nonyl, i-nonyl, n-dodecyl, n-tetradecyl, i-tetradecyl, hexadecyl, oleyl, n-octadecyl, nonylcyclohexyl, i-nonylphenyl, n-dodecylphenyl, i-dodecylphenyl and n-octadecylphenyl groups and mixtures thereof such as a mixture of $C_{12}$–$C_{18}$-aliphatic alcohols; preferably the 2-ethylhexyl, decyl, undecyl, n-dodecyl, tridecyl, tetradecyl, hexadecyl and octadecyl groups.

$R_2$ and $R_3$ can be alkyl groups with 1 to 5 carbon atoms, preferably the methyl and/or ethyl group and/or identical or different $(C_xH_{2x}O)_nH$-groups, also mono- or polyethylene glycol or propyleneglycol groups, in which $x$ can have the value 2 or 3, preferably 2, and $n$ a value from 0 to 10, preferably 0 to 3, $R_2$ and $R_3$ can also represent hydrogen.

Suitable compounds are for example: n-decylamine, the addition products of 2 mol of ethyleneoxide on n-hexadecylamine, of 10 mol of ethyleneoxide on 2-ethylhexylamine, of 2 mol of propyleneoxide on n-dodecylamine, of 1 mol of ethylene oxide on pentaeicosylamine, of 13 mol of ethyleneoxide on octadecenylamine, of 5 mol of propyleneoxide on trimethylhexylamine, of 1 mol of ethyleneoxide on a mixture of isomeric, branched tetradecylamines, of 2 mol of ethyleneoxide on a mixture of isomeric, branched trimethylhexyloxypropylamines, of 2 mol of ethyleneoxide on coconut oil amine, of 1 mol of propyleneoxide on $C_{19}$–$C_{26}$-alkylamine, of 2 mol of ethyleneoxide on a mixture of $C_{10}$–$C_{17}$ alkylamines and 2 mol of ethyleneoxide on a mixture of oleyl and stearylamines, of 2 mol of ethyleneoxide on $C_{10}$- to $C_{14}$-alkylamine, also for example n-dodecyl-N,N-dimethylamine, $C_{16}$–$C_{18}$-alkylamine - N - pentylamine, $C_{10}$–$C_{14}$-alkyl-N-methylamine and trimethylhexyl-N-N-diethylamine.

Such primary and secondary amines with alkyl groups with greater numbers of carbon atoms can be prepared for example by the reaction of ammonia with appropriate hydroxy compounds such as alkanols and alkenols. If desired, they can be subjected to the alkylation and alkoxylation. The alkoxylation, depending upon the selection of the substituents $R_2$ and $R_3$, oxethylation or propoxylation, occurs without the use of catalysts to the addition of 2 mol of the alkyleneoxide, the product being for example, the di-hydroxyethyl-derivative. However, in the presence of catalytically active quantities of alkali, for example in the form of sodium hydroxide, the alkylamines will absorb from 1 to approximately 500 units of ethyleneoxide.

If the dihydroxyethyl derivatives, prepared without use of catalyst, are used as the initial substance for the catalytic transformation, the yield will be ethoxides with a narrower molecular weight distribution than in case of direct reaction of the free amine with ethyleneoxide in the presence of alkali. The additive will increase in its effectiveness if the molecular weight distribution is held close to the desired degree of oxethylation and the last-mentioned method is preferred. However, it is also possible to employ the mono- or dihydroalkyl derivatives or the free amines as principal components for the preparation of the salts.

The alkyloxypropyl-N-methyl and N,N-dimethylamines can be prepared for example by reaction of formaldehyde and formic acid or of formaldehyde and hydrogen with the appropriate amines in the presence of hydrogenation catalysts.

It is also possible to employ oxo compounds with a higher number of carbon atoms, thereby obtaining corresponding alkyl derivatives with a higher number of carbon atoms. It is also possible to react alcohols or their sulphates of chloroalkanes with amines such as methylamine, dimethylamine, diethylamine, ethanolamine and diethanolamine thereby arriving at the corresponding secondary and tertiary amines.

Suitable carboxylic acid components of the formula

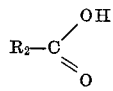

are those in which $R_2$ is a saturated or unsaturated, straight chain or branched alkyl or alkenyl or aryl group with 5 to 25, preferably 9 to 17, carbon atoms. Suitable $R_2$ groups are for example the n-pentyl, n-heptyl, 2-ethylpentyl, n-nonyl-, n-undecyl, n-tridecyl, n-pentadecyl, n-heptadecenyl, n-heptadecyl and phenyl-groups and mixtures thereof.

Suitable salts in accordance with the invention are those which contain, for example, the following components: n - dodecylamine+2 mol of ethyleneoxide and stearic acid, n-octadecylamine and lauric acid, coconut oil alkylamine and stearic acid, sec-tetradecylamine+2 mol of propyleneoxide and caprylic acid, n-dodecylamine and behenic acid, n-dodecylphenylamine+2 mol of ethyleneoxide and caproic acid, $C_{10}$–$C_{14}$-alkylamine+2 mol of ethyleneoxide and cerotic acid, n-octadecylamine+1 mol of ethyleneoxide and stearic acid, coconut oil alkylamine+20 mol of ethyleneoxide and tallow fat acid, as well as salts of n-octadecyldiethylamine and lauric acid, n-dodecylbutamine and lauric acid, tallow fat alkyldimethylamine and stearic acid and 2-ethylhexylmethylamine and myristic acid.

The newly proposed additives can be incorporated into the polyethylene in various ways. It is possible for example to prepare directly in a mixer a homogeneous mass from the polyethylene powder and the anti-electrostatic substance. Any commercially available rapidly turning mixer can be used for this purpose. It is also feasible to admix to the polyethylene the anti-electrostatic substance at a higher percentage than desired and to lower the ratio subsequently as required by the admixture of additional quantities of polyethylene. It is further possible to dissolve the anti-electrostatic substance in a suitable organic solvent, or to disperse, suspend or emulsify it and to add the solution, dispersion, suspension or emulsion with stirring to the polyethylene powder. The solvent is then removed, for example by distillation. A very suitable solvent for this purpose is methanol but any other easily distilled solvent is likewise suitable. It is also possible to accomplish the working-in of the anti-static substance into the polyethylene directly on rollers or in case of injection molding within an extruder.

The working-in and the homogenizing can include also other anti-electrostatic substances which are known per se as well as other additives normally used for processing of plastic such as pigments, stabilizers, lubricants, plasticizers and fillers.

It is advantageous to admix to the polyethylene additional substances for the prevention of a slight yellowing of the anti-static agent which occurs when the substances have been subjected to high temperatures over a longer period of time. As stabilizers for this specific purpose there are suitable for example phosphites, especially didecylphenylphosphite, triphenylphosphite, tris-(nonylphenyl)-phosphite and tris-(nonylphenol +9 mol of ethyleneoxide)-phosphite, admixed in quantities of .1 to .3 percent by weight.

Also usable for this purpose are alkyl sulphonates, for example 1.5 percent by weight of pentadecylsulphonate of sodium.

The above listed anti-static agents should be worked into the polyethylene in quantities ranging from .1 to 4.0 percent by weight relative to the polyethylene. Quantities between .3 and 1.5 percent by weight are preferred because these amounts will insure full protection from dust particles due to electrostatic attraction even under very dry and warm atmospheric conditions without influencing materially the crack-free stability of the highly crystalline polyethylene.

Lower concentrations, for example, .1 to .3%, will cause a substantial decrease in the protection from electrostatic charges. It will still be effective in case of cool and humid air but not in case of warm and dry air. If concentrations below .05% are used, there will hardly be any anti-electrostatic effect and consequently no protection from dust accumulation. Concentrations in excess of 4% are unnecessary because they will not improve the anti-electrostatic effect any further.

The anti-static property of the molded bodies is determined by the ash-particle test method, by measuring the surface resistivity in accordance with "DIN 53,482—VDE 0303, part 3) and by use of specifications for the diminishing of the charge according to Schwenkhagen by employing the rotating field intensity meter (see M. Buehler 'Textilpraxis," 1957 12/11, page 1147). The measurements were made by use of 1 mm. thick molded square plates with an edge of at least 150 mm. length.

The ash-particle test is carried out in the following manner:

The plate to be tested is rubbed with a cotton cloth and then held above crushed cigar or cigarette ashes. The test is considered to be positive if the test plate so rubbed will not attract ash particles from a distance of .3 cm. Since the humidity of the air has a strong influence on the electrostatic charge all measurements, unless specified otherwise, were carried out at 22° C. and 40% relative humidity. The table summarizes the test values obtained from the articles produced by various methods. (In case of the ash-particle test the symbols denote:

$+$=no ashes attracted; $(+)$= slight attraction;
$(-)$=average attraction; and $--$=strong attraction).

For the purpose of comparing the tendency to form cracks of molded bodies of crystalline polyethylene and molded bodies made of anti-statically treated polyethylenes in accordance with the invention and of molded polyehtylene bodies treated in known manner rectangular box-type structures (weight 200 g.), measuring 280 x 40 mm. were employed which, having (a) various wall thicknesses at bent parts,
(b) sharp edges transistions,
(c) different reinforcing ribs, will be a proper representation of industrially used boxes.

The boxes were produced by a 260 g. Stuebbe screw injection molding machine under the following specifications:

CONSTANT CONDITIONS

| | |
|---|---|
| Temperature of mass | 250 to 260° C. (this temperature range was selected because it is normally used in practice). |
| Maximum injection | 130 atmospheres gauge pressure. |
| Injection speed | 3 seconds. |
| Screw revolutions per minute | 90 (injection was carried out with turning screw). |
| Duration | 50 seconds. |
| Pause | 10 seconds. |

VARIED CONDITIONS

| | | | |
|---|---|---|---|
| After-pressure | 50 atm | | 35 atm. |
| Duration of after-pressure | 5 seconds | | 5 seconds. |
| | 8 seconds | | 8 seconds. |
| | 15 seconds | | 15 seconds. |

The boxes were then stored at 100° C. in a drying chamber and periodically inspected for crack formation. The results of all tests are listed in the following table. This table shows an outstandingly low occurrence of cracks in molded bodies prepared in accordance with the invention in comparison with molded bodies prepared in accordance with the present state of art, with the anti-electrostatic properties being identical in all cases.

We claim:
1. An anti-electrostatic molded body consisting essentially of an intimate mixture of a polyethylene and from 0.1 to 4% by weight, based upon the weight of the polyethylene of a salt of the formula

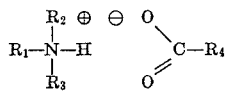

in which $R_1$ represents a member selected from the group consisting of alkyl, alkenyl, alkylcycloalkyl, aryl, alkylaryl and alkenylaryl groups containing from 6 to 26 carbon atoms in the akyl and alkenyl groups, $R_2$ and $R_3$ each represents a member selected from the group consisting of alkyl groups containing from 1 to 26 carbon atoms, alkenyl, alkylcycloalkyl, aryl, alkylaryl and alkenylaryl groups containing 6 to 26 carbon atoms in the alkyl and alkenyl groups, and the group $(C_xH_{2x}O)_nH$ in which $x$ stands for one of the numbers 2 and 3 and $n$ stands for one of the numbers 0 to 10, and $R_4$ stands for a member selected from the group consisting of alkyl, alkenyl and aryl groups containing from 5 to 25 carbon atoms in the alkyl and alkenyl groups.

TABLE

| | | | Low crystalline polyethylene | | High crystalline polyethylene | | Crack formation per hours at 100° C. | | | | | | | |
|---|---|---|---|---|---|---|---|---|---|---|---|---|---|---|
| Example | Substance amount of additive 0.5% based on the amine component | Post pressure in atmospheres gauge (time: 8 sec.) | Surface resistance at 23° C. and 40% relative humidity | Ash-test | Surface resistance at 23° C. and 40% relative humidity | Ash-test | 1 | 2 | 3 | 5 | 8 | 10 | 20 | 50 | 100 |
| 1 | n-Dodecylammonium laurate. | 50 | 1–2.10⁴ | + | 4–5.10⁴ | + | | | | 1 | 1 | m | m | st | |
| | | 35 | 3.10⁴ | + | 5.10⁴ | + | | | | | 1 | 1 | 1 | 1 | m |
| 2 | N,N-bis-hydroxyethyl-n-dodecylammonium-laurate. | 50 | 6.10³ | + | 6–8.10³ | + | | | | 1 | 1 | m | m | st | |
| | | 35 | 8–9.10³ | + | 1.10⁴ | + | | | | 1 | 1 | 1 | 1 | m |
| 3 | N,N-dimethyl-n-octadecyl-ammoniumstearate. | 50 | 3.10⁴ | + | 3–4.10⁴ | (+) | | | | 1 | 1 | m | m | st | |
| | | 35 | 2.10⁴ | + | 1–5.10⁴ | + | | | | | 1 | 1 | 1 | m | |
| 4 | N-methyl-n-dodecylammonium-myristate. | 50 | 1–2.10⁴ | + | 2–4.10⁴ | + | | | | 1 | 1 | m | st | | |
| | | 35 | 4.10⁴ | (+) | 5.10⁴ | (+) | | | | | | 1 | 1 | | m |
| 5 | Salt from (coconut oil alkylamine+5 mols of ethyleneoxide) and tallow fatty acid. | 50 | 3.10⁴ | + | 2–3.10⁴ | + | | | 1 | 1 | 1 | m | st | | |
| | | 35 | 1–2.10⁴ | + | 4.10⁴ | + | | | | | 1 | 1 | m | m | |
| 6 | n-Hexylammoniumlaurate | 50 | 4–5.10⁴ | (+) | 5–7.10⁴ | (+) | | | 1 | 1 | m | m | m | st | |
| | | 35 | 1–2.10⁴ | + | 4.10⁴ | (+) | | | | | 1 | 1 | m | m | |
| 7 | Salt from 3₁₀–C₁₄ alkylamine and behenic acid. | 50 | 4.10⁴ | (+) | 3.10⁴ | (+) | | | | 1 | m | m | st | | |
| | | 35 | 2–3.10⁴ | + | 6.10⁴ | + | | | | | 1 | 1 | m | m | |
| | Comparative examples: | | | | | | | | | | | | | | |
| 8 | n-Dodecylamine | 50 | 3.10⁴ | + | 3–4.10⁴ | + | 1 | 1 | m | st | | | | | |
| | | 35 | 3–5.10⁴ | + | 5.10⁴ | + | | | 1 | m | st | | | | |
| 9 | N,N-bis-hydroxy-ethyl-n-dodecyl-amine. | 50 | 5.10³ | + | 6–9.10³ | + | 1 | 1 | 1 | m | st | | | | |
| | | 35 | 6–8.10³ | + | 8.10³–2.10⁴ | + | | | | 1 | 1 | st | | | |
| 10 | N,N-dimethyl-n-octa-decylamine. | 50 | 4–5.10⁴ | (+) | 2–5.10⁴ | (+) | | 1 | 1 | m | st | | | | |
| | | 35 | 5.10⁴ | (+) | 3–4.10⁴ | (+) | | | 1 | m | st | | | | |

+ = no cigaret ashes are attracted.
(+) = some cigaret ashes are attracted.

1 = Slight cracks (length about 0.2–1 mm.), m = Medium cracks (about 1–5 mm. in length), st = Strong cracks (length more than 5 mm.).

References Cited

UNITED STATES PATENTS 3,321,456  5/1967  Braus et al.
3,332,912  7/1967  Rochlitz et al.

JOSEPH L. SCHOFER, *Primary Examiner.*

L. EDELMAN, *Assistant Examiner.*